Sept. 20, 1971     D. AMBROSIUS     3,606,552
PHOTOGRAPHIC EXPOSURE MEASURING DEVICE
Filed March 12, 1969     2 Sheets-Sheet 2

INVENTOR
DIETER AMBROSIUS
BY Young + Thompson
ATTYS.

United States Patent Office 3,606,552
Patented Sept. 20, 1971

3,606,552
PHOTOGRAPHIC EXPOSURE MEASURING DEVICE
Dieter Ambrosius, Dresden, Germany, assignor to Kombinat Veb Pentacon Dresden Kamera- und Kinowerke, Dresden, Germany
Filed Mar. 12, 1969, Ser. No. 806,651
Int. Cl. G01j 9/42
U.S. Cl. 356—227                               6 Claims

ABSTRACT OF THE DISCLOSURE

A photo-electric exposure measuring device includes in a housing an exposed measuring circuit having an indicating device connected with a photo sensitive device influenced by prevailing light conditions. A plurality of exposure factor setting devices influence a summation element rotatably mounted on the housing which summation element influences the indication of the indicating device. The summation element is provided with guide means engageable by a lever for operating a switch. In use, the measuring circuit is connected to a source of supply potential via the switch. The switch is operative via the lever and guide means and disconnects the source of supply potential when the combination of exposure factor settings are outside the range of the measuring device.

BACKGROUND OF THE INVENTION

Exposure measuring devices are known in which the adjustment range of the adjuster is larger than the measuring range which can be coped with. Contacts or lugs are provided at the end of the measuring zone which put the exposure measuring device out of operation. With adjusters which can be rotated beyond 360°, the operating state is merely nullified during the reverse transition from one end of the measuring range to the other. As soon as the reverse transition has been completed, the exposure measuring device is once again in its operating state. It is thus possible for one and the same dimension indication to correspond to different combinations of the selectable exposure factors, of which, however, only one combination is suitable for satisfactory exposure, while the other combinations would lead to under-or over-exposure.

In order to increase the operational reliability of the system, the purpose of the invention is to provide a device by which the operating state is only maintained within the measuring range with which the exposure measuring device can cope.

SUMMARY OF THE INVENTION

According to the invention a photo-electric exposure measuring device having a housing, an exposure measuring circuit mounted on the housing and including an indicating device connected with a photo-sensitive device influenced by prevailing light conditions, and a plurality of exposure factor setting devices, there is provided a summation element, influenced by the exposure factor setting device rotatably mounted on the housing and adapted to influence the indication of the indicating device, which summation element is provided with guide means engageable by a lever means for operating a switch whereby when the measuring circuit is connected with a source of supply potential via said switch and the exposure factor setting devices are adjusted the switch is operative via the lever means and guide means, to disconnect the source of supply potential when the combination of exposure factor settings are outside the measuring range of the measuring device. In an advantageous version of the invention, the guide means is positioned spirally in a plane parallel to the plane of rotation of the summation element. In a further advantageous version of the guide means are provided on the periphery of the summation element. The summation element can be coupled with the sliding contact of a variable resistor, a follow-up indicator or a rotatably mounted measuring mechanism.

BRIEF DESCRIPTION OF DRAWINGS

An embodiment of the invention will now be described by way of example with reference to the accompanying drawings in which.

DESCRIPTION OF PREFERRED EMBODIMENT

Figure 1:
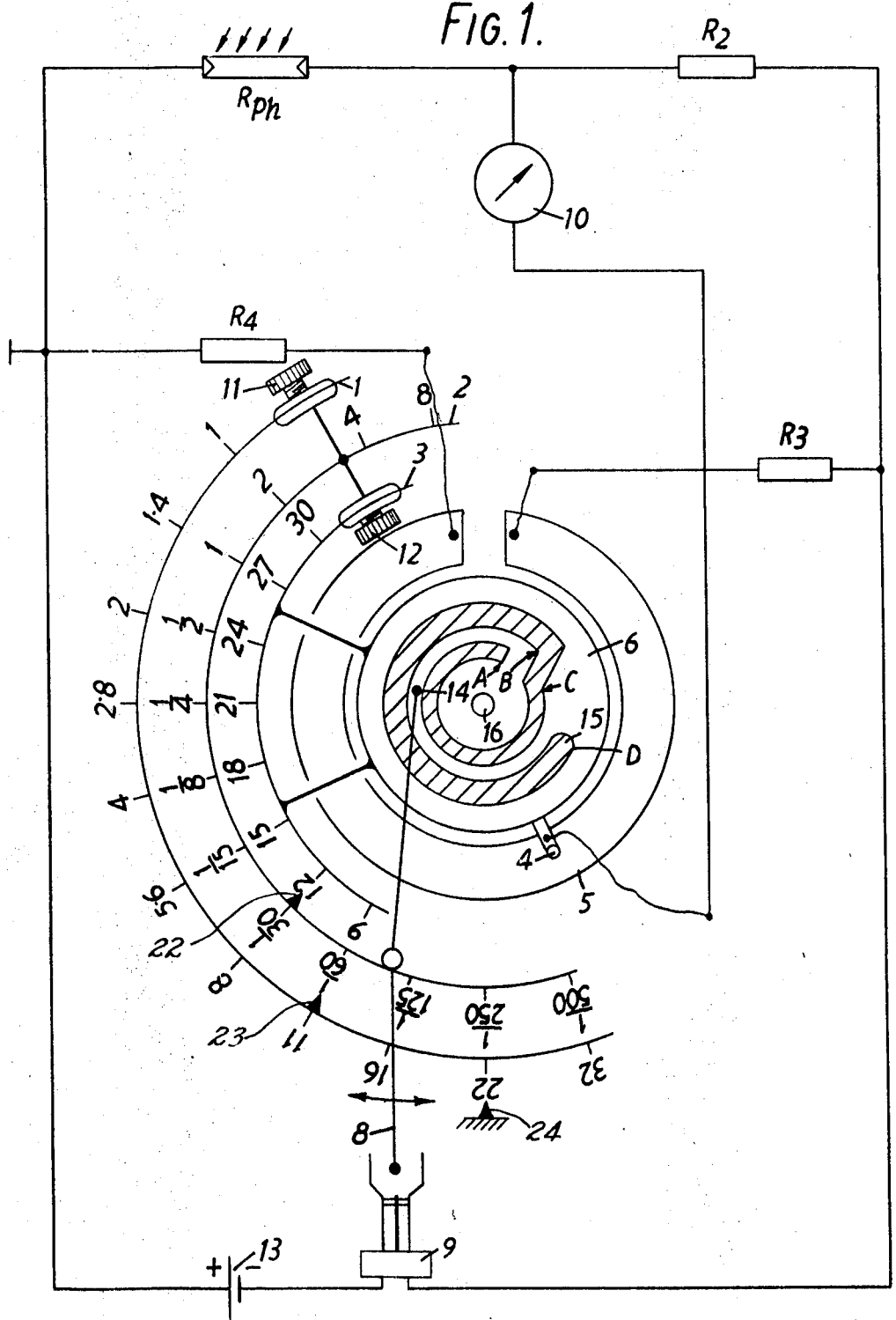
FIG. 1 shows an exposure-measuring device with sliding contact, in the operated state.

In a housing, not shown in the drawing, and belonging to an exposure meter or a photographic camera, are mounted the diaphragm adjuster 1, an exposure time setting device 2 and an film speed setting device 3, so as to be movable; these setting devices are capable of being coupled, by means of clamp screws 11 and 12, in different relative positions to one another, as a result of which different combinations of diaphragm aperture, exposure time and film speed can be selected. The film speed setting device 3 is rigidly coupled with the adjuster 6. The adjuster 6 is coupled the sliding contact 4 which slides over a variable resistor 5. The variable resistor 5 is situated in a branch of a bridge circuit of which a diagonal branch contains a measuring mechanism 10.

The circuit includes a battery 13 in series with a main switch 9, which can be actuated by a switch lever 8. An indexing pin 14 of the switch lever 8 extends into a guide 15 which is rigidly connected with the adjuster 6. The shifting-guide 15 is provided, inside the measuring range determined by switch operating stops B and C, with a concentric guide section which is followed by shifting-sections between the magnitudes A and B, and between C and D (these sections being rotatable) in both directions. These shifting-sections move to a smaller or greater distance from the pivot 16 of the adjuster 6.

The method by which the device operates is as follows:

By releasing the clamping screws 11 and 12 the setting devices 1, 2 and 3 can be rotated in relation to one another, and various combinations of diaphragm aperture, exposure time and film speed can thus be selected. The sum of the exposure factors selected by these adjusting devices is expressed in one rotation of the adjuster 6.

In the adjusting operation the screw 12 is first of all released and the value of the film speed (e.g. "12") placed opposite the mark 22 on the time adjusting device 2. In this process the "adjuster" 6 rotates. In this position the setting devices 2 and 3 are secured by tightening up the screw 12. The screw 11 is then released. By rotating the time setting device 2 the desired exposure time (e.g. "1/60") is placed opposite the mark 23 on the diaphragm adjuster 1. In this process the "adjuster" 6 rotates once again. In this position the screw 11 is tightened up. The sum of the exposure factors, "film speed" and "exposure time" has thus been set by the "adjuster" 6. The setting devices 1, 2 and 3 secured to one another, are now rotated until the measuring mechanism 10 no longer shows any deflection. In this zero position of the measuring unit the diaphragm value "22" is situated opposite the fixed mark 24 on the housing. The values "12" of the setting device 3, "1/60" of the setting device 2 and "22" of the adjuster 1, represent a correct setting for the prevailing light conditions.

In this process, the sliding contact 4 slides over the variable resistor 5. The indexing pin 14 slides in the concentric range between the switch operating stops B and C of the guide 15. As soon as a combination of the values for diaphragm, exposure time and film speed has been selected which goes beyond the measuring range which can be coped with, the indexing pin 14 is pivoted when the regulating magnitudes B or C are reached, and is guided concentrically, either in the range between the stops A and B or in the range between the stops C and D (cf. FIG. 2). In these concentric ranges of the guide 15 the main switch 9 is opened, i.e. the operating state of the measuring device is nullified.

Figure 2:
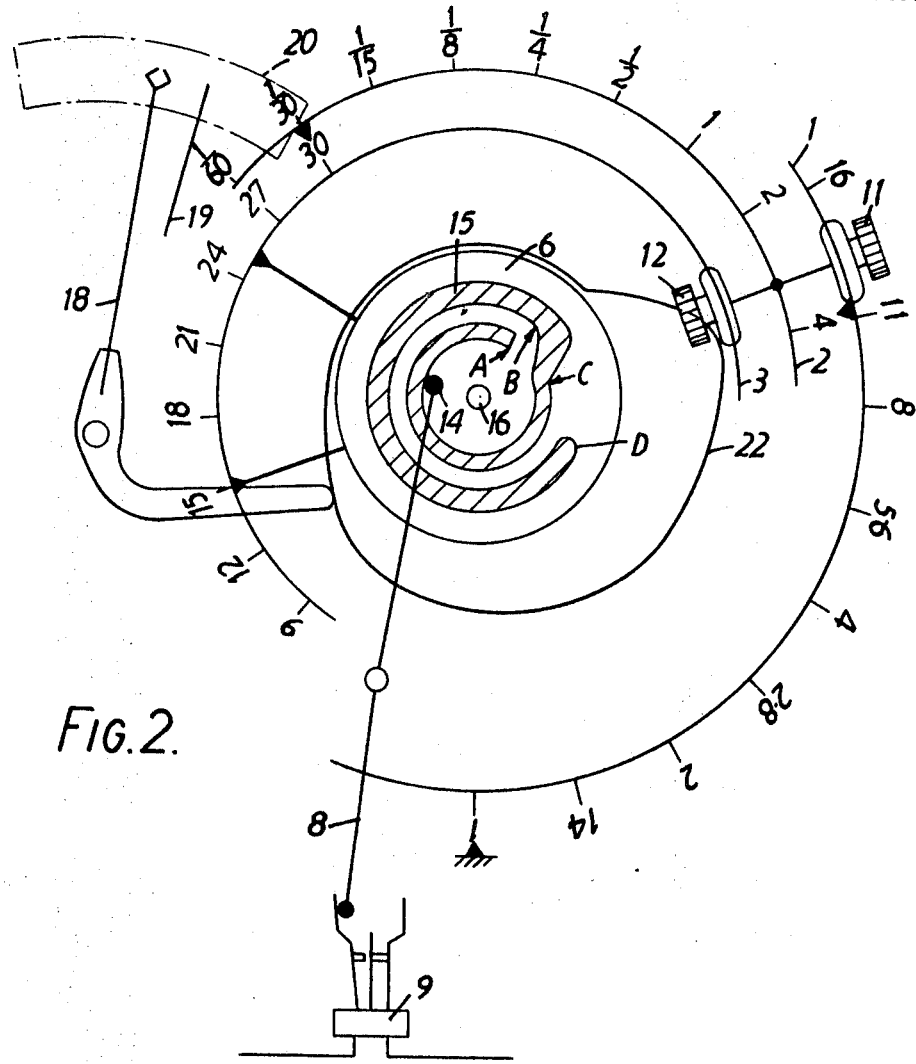
FIG. 2 an exposure-measuring device with follow-up indicator, in the disconnected state.

According to FIG. 2, the adjuster 6 is coupled with a follow-up indicator 18 which is visible, together with an indicating element 19 of a meter, in an observation window 20. The indicating element of the meter is influenced by prevailing light conditions in a known manner. A combination suitable for correct exposures is selected in the known manner when the follow-up indicator 18 and the indicating element 19 coincide in position. An adjusting cam 22 can also be arranged to move a rotatably mounted measuring mechanism, for example a meter, in the known manner.

Figure 3:
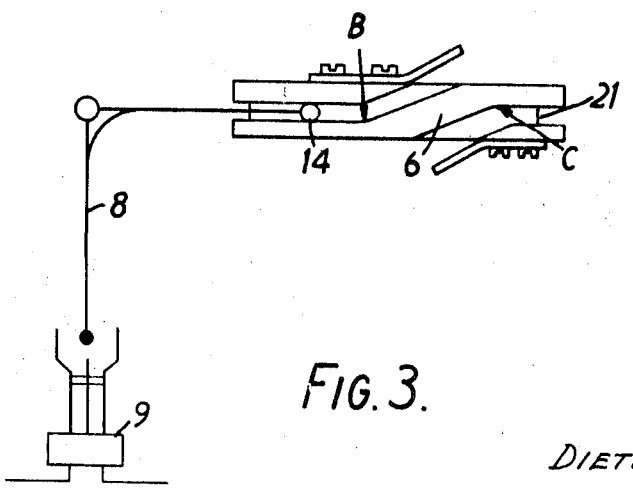
FIG. 3 a further version of the guide.

In a further version, as shown in FIG. 3, the adjuster 6 is provided with a guide 21 which surrounds the external periphery of the adjuster 6. The method of operation is the same as in the versions shown in FIGS. 1 and 2.

I claim:

1. In a photo-electric exposure measuring device having a housing, an exposure measuring circuit mounted on the housing and including an indicating device connected with a photo sensitive device influenced by prevailing light conditions, and a plurality of exposure factor setting devices, the provision of a summation element, influenced by the exposure factor setting devices, rotatably mounted on the housing and adapted to influence the indication of the indicating device, which summation element is provided with guide means engageable by a lever means for operating a switch whereby when the measuring circuit is connected with a source of supply potential via said switch and the exposure factor setting devices are adjusted, the switch is operative via the lever means and guide means, to disconnect the source of supply potential when the combination of exposure factor settings are outside the measuring range of the measuring device.

2. A photo-electric exposure measuring device according to claim 1, wherein the guide means is positioned spirally in a plane parallel to the plane of rotation of the summation element.

3. A photo-electric exposure measuring device according to claim 1, wherein the guide means is positioned on the periphery of the summation element.

4. A photo-electric exposure measuring device according to claim 1, wherein the summation element is coupled with the sliding contact of a variable resistor which is connected in the exposure measuring circuit whereby the indicating device is influenced.

5. A photo-electric exposure measuring device according to claim 1, wherein the summation element is coupled with a follow-up indicator.

6. A photo-electric exposure measuring device according to claim 1, wherein the indicating device is a rotatably mounted measuring unit rotatable by the summation element.

References Cited
UNITED STATES PATENTS

| | | | |
|---|---|---|---|
| 2,172,634 | 9/1939 | Axtell | 356—231 |
| 2,258,635 | 10/1941 | Uffrecht | 235—64.1X |
| 3,031,921 | 5/1962 | Lipsitz | 356—228 |
| 3,421,006 | 1/1969 | Hahn | 356—226 |

RONALD L. WIBERT, Primary Examiner

C. CLARK, Assistant Examiner